US006216199B1

(12) United States Patent
DeKoning et al.

(10) Patent No.: US 6,216,199 B1
(45) Date of Patent: Apr. 10, 2001

(54) HARDWARE MECHANISM FOR MANAGING CACHE STRUCTURES IN A DATA STORAGE SYSTEM

(75) Inventors: Rodney Allen DeKoning, August; John Richard Kloeppner, Hesston; Dennis Eugene Gates, Wichita, all of KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/366,827

(22) Filed: Aug. 4, 1999

(51) Int. Cl.[7] .................................................. G06F 12/08
(52) U.S. Cl. .............................. 711/3; 711/118; 711/137
(58) Field of Search .............................. 711/3, 118, 137; 707/102

(56) References Cited

U.S. PATENT DOCUMENTS

| 5,008,820 | * | 4/1991 | Christopher, Jr. et al. ............... 707/1 |
| 5,751,993 | * | 5/1998 | Ofek et al. ............................ 711/136 |
| 5,761,501 | * | 6/1998 | Lubbers et al. ....................... 707/100 |
| 5,960,452 | * | 9/1999 | Chi ....................................... 711/117 |
| 6,115,790 | * | 9/2000 | Schimmel ............................. 711/119 |

* cited by examiner

*Primary Examiner*—Hiep T. Nguyen (57) ABSTRACT

A system and method for managing data stored in a cache block in a cache memory includes a cache block is located at a cache block address in the cache memory, and the data in the cache block corresponds to a storage location in a storage array identified by a storage location identifier. A storage processor accesses the cache block in the cache memory and provides a cache management command to a command processor. A processor memory coupled to the storage processor stores a search key based on the storage location identifier corresponding to the cache block. A command processor coupled to the storage processor receives a cache management command specified by the storage processor and transfers the storage location identifier from the processor memory. A cache management memory stores a cache management structure including the cache block address and the search key. A cache management processor is coupled to the cache management memory by a second link to manipulate the cache management structure in a hash table with linked lists at each hash queue element within the cache management memory in accordance with the cache management command and the search key.

19 Claims, 7 Drawing Sheets

HARDWARE MECHANISM FOR MANAGING CACHE STRUCTURES IN A DATA STORAGE SYSTEM

BACKGROUND OF THE INVENTION

1. Field of the Invention

The present invention relates generally to storage controller systems, and more particularly to a hardware mechanism for managing cache structures in a storage controller system.

2. Description of Related Art

Host computer systems often connect to one or more storage controllers that provide access to an array of storage disks. A host system requests access to data at a virtual disk location, and a storage controller accesses a corresponding physical storage location on one of the storage disks and provides access to the data by the host system. Typically, a storage controller includes one or more microprocessors that communicate the data between the storage disk and the host system.

A common feature of a storage controller system is disk caching, which involves temporarily storing contiguous regions of data from a storage disk to a cache memory unit. It is to be understood that accesses to a memory unit typically complete much more quickly than accesses to a storage disk. To access a storage location, a storage system microprocessor will specify a physical storage location on the storage disk. However, instead of retrieving only the specified storage location, the microprocessor will also retrieve (i.e., "prefetch") a subsequent, sequential portion of the storage disk, loading it into the cache memory. The reasoning behind this caching of sequential data from the storage disk is that storage disk accesses are most likely sequential in nature. Therefore, it is probable that the next access by the microprocessor will be to the next sequential storage location on the storage disk, which has already been loaded into the cache memory during the prefetch. When the requested data is found in a cache memory, it is referred to as a "cache hit." In contrast, when the requested data in not found in the cache memory, it is referred to as a "cache miss". A cache miss requires that the storage control system perform the normal retrieval of the requested data from the disk array. As a result, the microprocessor in the storage controller can, with a cache hit, avoid the time-consuming access to the next storage location on the storage disk, and instead quickly access the data in the cache memory and return it to the microprocessor. In most circumstances, disk caching results in increased performance of the data storage system.

One method of identifying a storage location is called Logical Block Addressing (LBA). LBA is an addressing scheme to overcome a 528 megabyte limit imposed on the current addressing standard for an IDE (Integrated Disk Electronics) disk drive. Effectively, LBA is used with SCSI and IDE disk drives to translate specified cylinder, head, and sector parameters of the disk drive into addresses that can be used by an enhanced BIOS to access the disk drive. In SCSI systems, a Logical Unit Number (LUN) is preferably combined with the LBA address to constitute a storage location identifier. Alternative addressing schemes employing storage location identifies also exist, including ECHS (Extended Cylinder, Head, Sector addressing), "Large", and "Big IDE" addressing.

Typically, a storage processor manages a disk cache by manipulating cache structures in main memory. However, the operations of inserting, deleting, and searching cached elements are highly processor-intensive and divert processing power from other functions of the storage control system. Furthermore, cache management relies heavily on memory access to manipulate the cache structures and, therefore, can consume a significant amount of processor bus bandwidth if managed by the storage processor in processor memory. Also, manipulation of the cache management structures by the storage processor can dilute the storage processor's first and second level caches. A need exists for a high performance cache management state machine capable of reducing the impact of cache management on the storage processor, processor memory bus, and processor caches.

SUMMARY OF THE INVENTION

A method for managing data stored in a cache block in a cache memory is provided. The cache block is located at a cache block address in the cache memory. The data in the cache block corresponds to a storage location in a storage array identified by a storage location identifier. A cache management command and a processor memory address are received from a storage processor. The processor memory address is associated with a search key based on the storage location identifier. The search key is transferred from the processor memory in accordance with the processor memory address. A cache management structure is manipulated in accordance with the cache management command and the search key.

A system for managing data stored in a cache block in a cache memory is also provided. The cache block is located at a cache block address in the cache memory, and the data in the cache block corresponds to a storage location in a storage array identified by a storage location identifier. A storage processor accesses the cache block in the cache memory and provides a cache management command to a command processor. A processor memory coupled to the storage processor stores a search key based on the storage location identifier corresponding to the cache block. A command processor coupled to the storage processor receives a cache management command specified by the storage processor and transfers the storage location identifier from the processor memory. A cache management memory stores a cache management structure including the cache block address and the search key. A cache management processor is coupled to the cache management memory by a second link to manipulate the cache management structure in a linked data structure within the cache management memory in accordance with the cache management command and the search key.

An embodiment of the present invention provides several advantages over the prior art. By employing a hardware-oriented cache manager, a storage processor in storage control system can continue performing other work in parallel with the cache manager, improving overall performance of the storage control system. Furthermore, the instruction working set size for the storage processor is greatly reduced because the storage processor is not responsible for accessing and managing the cache management structures in cache memory. In addition, a hardware state machine embodying a cache manager may optimize its cache management memory accesses to retrieve the appropriate structure lengths during its prefetch. By minimizing the cache management operations performed by the storage processor, it is possible to maximize the performance of a storage control system, especially one that controls large disk caches.

DETAILED DESCRIPTION OF THE PREFERRED EMBODIMENT

Embodiments of the invention described herein are generally implemented as logical operations in an intelligent controller in a storage control system. The logical operations of the present invention are implemented (1) as a sequence of operations directed by program instructions running on an intelligent controller, and (2) as interconnected machine or circuit modules within the intelligent controller. The implementation is a matter of choice, dependent on the performance requirements of the intelligent controller implementing the invention. Accordingly, the logical operations making up embodiments of the present invention described herein are referred to variously as operations, steps, and modules.

Figure 1:
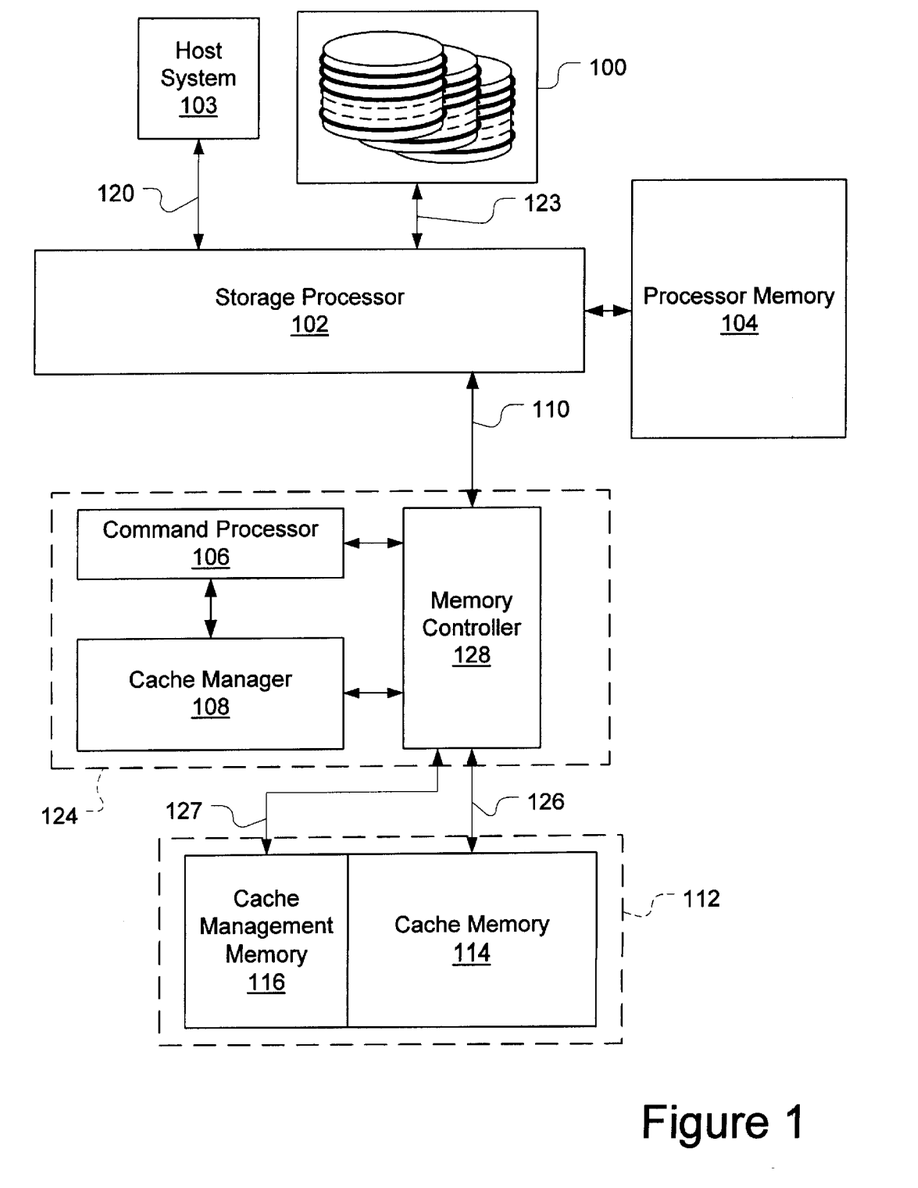
FIG. 1 depicts a block diagram of a storage control system microprocessor coupled to a cache manager device in an embodiment of the present invention.

FIG. 1 depicts a block diagram of a storage controller system coupled to a cache manager device in an embodiment of the present invention. A disk array 100 is coupled to a storage controller, including a storage processor 102, processor memory 104, a cache management interface 124, and a cache memory device 112, via a link 123. Preferably, the link 123 is a SCSI, fiber channel or PCI link, although other common bus architectures are contemplated for the link 123 and other data links in embodiments of the present invention. The cache memory device 112 comprises a cache memory region 114 storing cache blocks ("CBs") at cache block addresses, and a cache management memory region 116 storing cache management structures. Furthermore, it is preferred that the cache memory device be a battery-backed memory to provide persistent storage. In an alternative embodiment, the cache memory region 114 and cache management memory region 116 may be allocated to multiple and/or separate memory devices.

The storage processor 102 processes data communicated from a host system 103 in accordance with program instructions stored in a processor memory 104. The storage processor comprises one or more microprocessors, such as an Intel x86-compatible processor, including the AMD K6, the Intel i960 processor, and a STRONGARM processor provided by Intel Corporation. Accessing data in the cache memory is considerably faster than accessing data from the disk array. Furthermore, there is a high probability that a host system will request data sequentially from the disk array. Therefore, when data from the disk array is requested by the host system 103, the storage processor 102 retrieves the requested data and additional data sequentially following the requested data. The retrieved data is loaded by the storage processor 102 into a cache block located at a cache block address in the cache memory region 114. As such, the next data request will likely be serviced from the cache block. That is, instead of accessing the disk array to service the next data request by the host, the storage processor services the data request from the cache memory region 114, thereby improving the performance of the data request.

The processor memory 104 stores the RAID algorithms and the logical representation (e.g., pointers) of at least one virtual disk volume controlled by the storage processor 102. A virtual disk volume presents a logically contiguous disk representation to the host system 103, regardless of the physical location of the recorded data in the disk array. For example, a storage controller can stripe regions of sequential data across multiple disks in the disk array to improve performance of accesses. The host system, however, is presented with a single virtual disk, which it accesses as though it were a single physical disk volume. When data is transferred into the cache memory region 114 from the storage processor 102, the data is transferred from the host system 103 via a host connection 120, preferably a SCSI, fiber channel or PCI link. The storage processor 102 then transfers the data across a link 110, preferably a SCSI, fiber channel or PCI bus, to a memory controller 128. The memory controller 128 processes data transfers among the storage processor 102, the command processor 106, the cache manager 108, and the cache memory 112. For example, cache data is transferred from the storage processor 102 via the memory controller 128 to a cache block in the cache memory region 114.

In an embodiment of the present invention, the location of the cache block in the cache memory region 114 is managed through a cache management interface 124 comprising command processor 106 and the cache manager 108. The command processor 106 receives cache commands from the storage processor 102, and communicates cache management data between the cache manager 108, and the storage processor 102 and processor memory 104. The cache manager 108 manipulates cache management structures stored in the cache management memory 116 in accordance with the cache commands.

Cache management structures called HWCCBs (Hardware Cache Control Blocks) are stored in the cache management memory region 116 and manipulated (e.g., in accordance with insertion, deletion, and search commands) by the cache manager 108. An HWCCB (shown graphically in the Cache Management Resource Link List in FIG. 3, for example) consists of two primary regions: the hardware region and the software region. The hardware region of an HWCCB preferably includes a 64 bit search key field, a 64 bit cache block (CB) address field, a 64 bit "next" pointer, a 64 bit status field, and a 64 bit local memory pointer. The hardware region is manipulated by the cache manager 108 and is accessed and updated by the cache manager 108 in accordance with the type of cache management operation that is being performed. If a HWCCB is queued (i.e., a cache operation for the HWCCB is pending) for access by the cache management interface 124, the hardware region of that HWCCB is not accessed by the storage processor 102 until the cache management operation is indicated as completed.

The software region of an HWCCB includes a Recovery Control Block (RCB) that is used by the cache manager 108 to recover the cached data in the event of a fault, as described in U.S. Pat. No. 5,588,110 to DeKoning et al. entitled METHOD FOR TRANSFERRING DATA BETWEEN TWO DEVICES THAT INSURES DATA RECOVERY IN THE EVENT OF A FAULT, specifically incorporated herein by reference for all that it discloses and teaches. Because the HWCCBs, and therefore the RCBs, are preferably stored in a battery-backed cache management memory region 116, when the storage controller is reinitiated at the "Start of Day" (i.e., at power up), the storage processor 102 can issue a ValidHWCCBSearch command to search the contiguous memory in the cache management memory region 116 looking for valid HWCCBs. In an embodiment of the present invention, a "VALID" status value is supported in the status field of the RCB. Accordingly, the RCB used by software to recover from a fault by quickly finding the addresses to valid cache blocks in the cache memory region 114.

The search key field of the HWCCB is used by the cache manager 108 as a key that uniquely defines a cache block. Preferably, the search key corresponds to a volume identifier (e.g., an LUN) and a volume LBA of the first block in the associated cache block. It could also include flags, for example, indicating the cache block state or type, such as "new_data", "old_data", "new_parity", or "old_parity". The CB address field stores a pointer to the location of the associated cache block in the cache memory region 114. For an INSERT command, the storage processor stores the CB address of the relevant cache block into the CB address field of a processor memory-based HWCCB image before issuing the INSERT command. For a SEARCH command, the cache manager 108 populates the CB address field of a cache management memory-based HWCCB, if the appropriate HWCCB is found, before transferring the HWCCB image back to the processor memory 104.

The "next" pointer is a pointer used to link the HWCCBs in a list within the cache management memory region 116, providing a traversal mechanism for the cache manager 108. That is, the next pointer allows the HWCCBs to be configured in a linked list in the cache management memory region 116. Alternatively, right and left pointers may be used to implement a binary tree structure in the cache management memory region 116, in accordance with the present invention. Furthermore, the similar pointers (e.g., "next", right, or left) can be used with regard to the HWCCB images in the processor memory 104 to provide a traversal mechanism for the storage processor 102. The status field of an HWCCB indicates the current state of the HWCCB data and an associated cache operation. Possible status values include a SUCCESS_COMPLETE status, a FAILURE_COMPLETE status, and an OPERATION_PENDING status. The status field may also indicate whether the data has been written to disk ("clean") or not ("dirty"), or whether the data is mirrored or unmirrored.

An HWCCB also preferably includes a local memory pointer pointing to a Cache Control Block (CCB) data structure in the processor memory 104. The CCBs are used to store information to allow more efficient processing of I/O (input/output) requests by the processor. For example, one or more intermediate calculation results, frequently-used addresses or frequently-used data values may be stored in CCBs to avoid unnecessary recalculations of the results, addresses, or data values. Preferably, a CCB includes a time stamp, a pointer to a next CCB in the processor memory, and the above-specified information. In an alternative embodiment of the present invention, the CCB information may be split between the CCBs in processor memory and the HWCCBs in the cache management memory region 116.

In an embodiment of the present invention, the storage processor 102 initiates a cache operation via the command processor 106. In processor memory 104, images of HWCCBs are configured by the storage processor 102 and stored in a contiguous region of processor memory 104. In an alternative embodiment, other non-contiguous data structures for storing the images of the HWCCBs, including a linked list, are contemplated within the scope of the present invention. If the storage processor 102, for example, writes a cache block to a cache block address in the cache memory region 114, the storage processor 102 populates an image of an HWCCB in the processor memory 104 with the cache block address and the search key. A local memory address field to CCB's in processor memory, as well as the RCB portion of the HWCCB, are also populated at this time. Additional HWCCB images may also be populated to provide a list of HWCCB images.

To initiate the INSERT command, for example, the storage processor 102 writes the processor memory address corresponding the first HWCCB of the list into a register of the command processor 106 and issues an INSERT command to the command processor 106. The command processor 106 then retrieves, via DMA (direct memory access) from the processor memory 104, the HWCCB images list pointed to by the processor memory address loaded in the command processor register. The command processor 106 loads the retrieved HWCCB images into HWCCBs in the cache management memory region 116. Preferably, HWCCBs is the cache management memory region 116 are managed using a Cache Management Resource Linked List (such as 304 of FIG. 3) to avoid allocating and deallocating HWCCBs as they are used, although such dynamic allocation techniques are contemplated within the scope of the present invention. The cache manager 108 traverses the retrieved list of HWCCBs in the cache management memory 116 and inserts each HWCCB into an appropriate linked data structure in the cache management memory region 116 via the memory processor 128 and a link 127, which is preferably a PCI bus. It should be understood, however, that the data links in FIG. 1 may be separate buses or one or more combined buses being shared by various entities on the bus, including the storage processor 102 and the memory controller 128.

Figure 3:
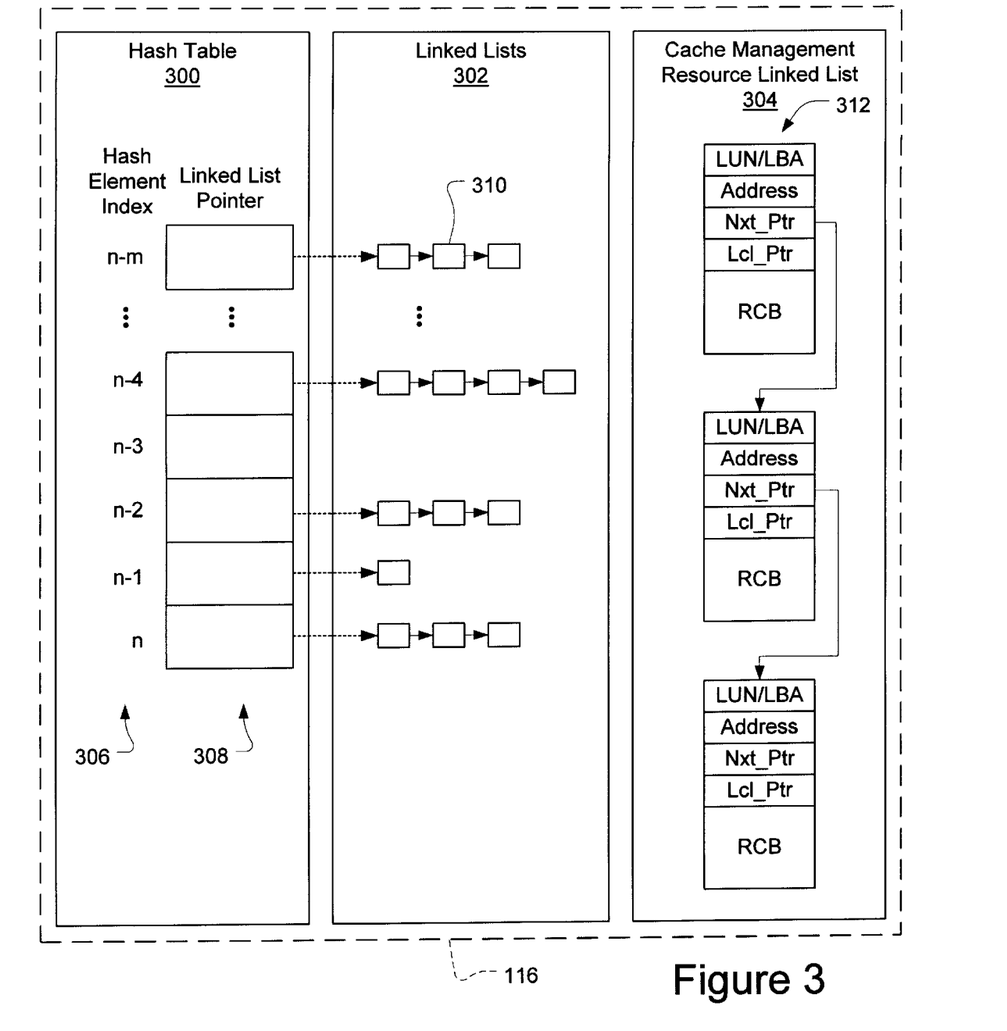
FIG. 3 illustrates logical elements stored in a cache management memory region in an embodiment of the present invention.

The cache management memory 116 preferably comprises a hash table and associated link lists of HWCCBs (see FIG. 3). In response to the INSERT command, for example, the cache manager 108 uses a hash table state machine in the cache manager to hash on a search key (preferably an LBA or LUN/LBA) to obtain an initial pointer to the beginning of a designated linked list in the cache management memory 116. Thereafter, the cache manager 108 traverses the linked list pointed to by the appropriate element of the hash table, and places the newest HWCCB at an appropriate position in the linked list. In an embodiment of the present invention, the linked list is ordered in accordance with the search key, although other ordering techniques are contemplated within the scope of the present invention, including first-in, first-out ordering and last-in, first-out ordering. Optionally, if the cache manager 108 encounters an HWCCB with the same search key as the one provided with the INSERT command, the cache manager 108 replaces the old HWCCB with a new HWCCB and returns the old HWCCB data to processor memory or into the Cache Management Resource Linked List, as shown in FIG. 3. Alternatively, the cache manager returns a status associated with the INSERT command that this particular insertion of the HWCCB was unsuccessful due to a collision in the hash table/linked list data structure. Other linked data structures may also be used to access the cache management structures in the cache management memory region 116, including without limitation contiguous blocks of memory, double linked lists, and binary trees. The processor memory 104 also stores cache control blocks ("CCBs").

Figure 2:
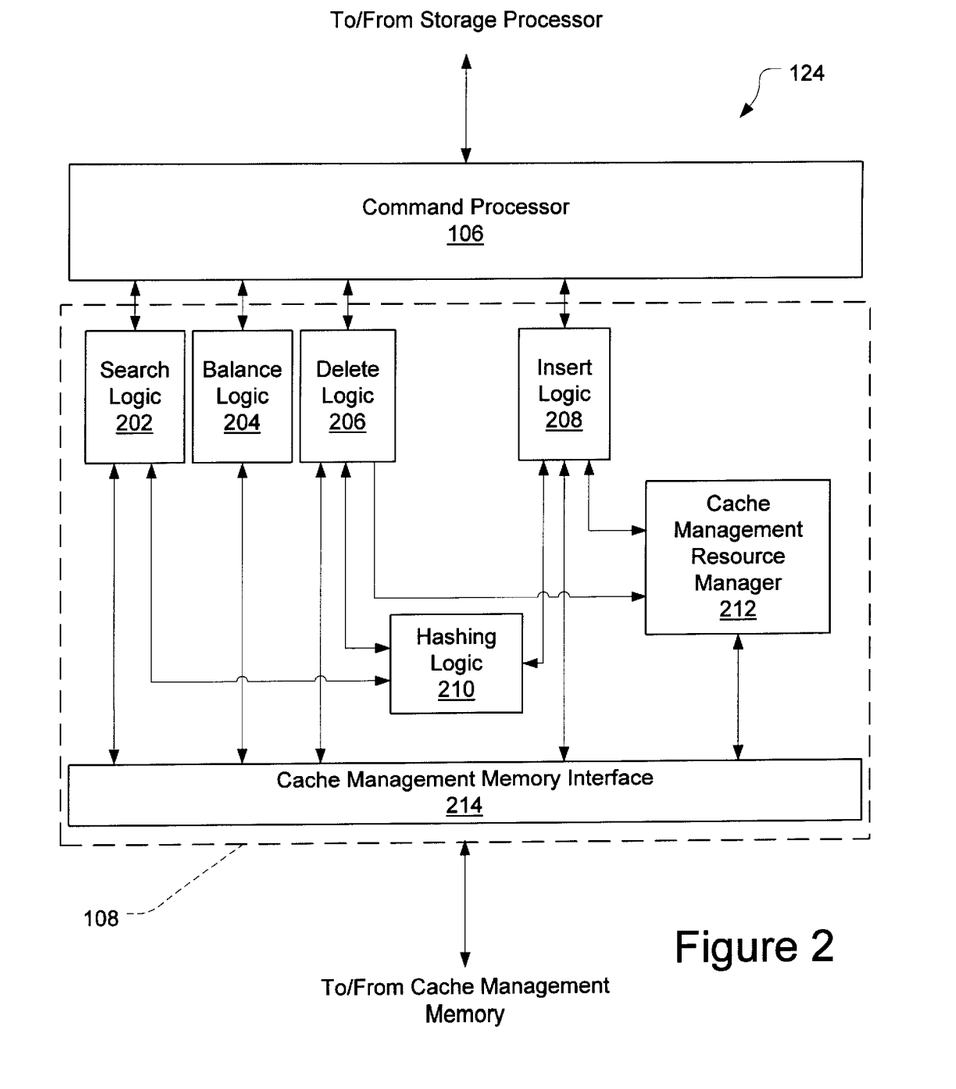
FIG. 2 depicts a block diagram of a cache management interface in accordance with the present invention.
Figure 6:
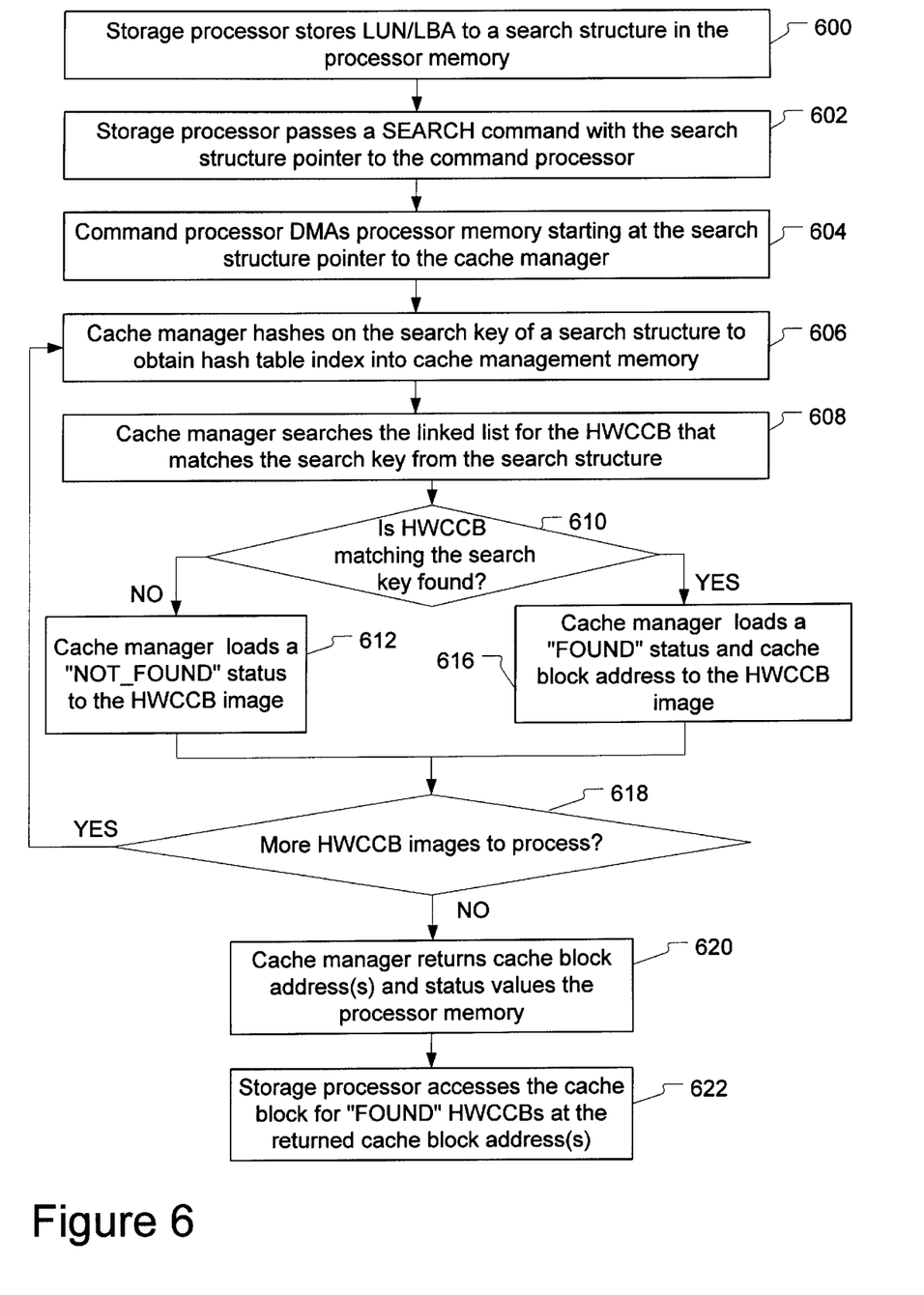
FIG. 6 depicts a flowchart of operations relating to a SEARCH command in an embodiment of the present invention.

FIG. 2 depicts a block diagram of cache management interface 124 in accordance with the present invention. The command processor 106 sends and receives data to and from the storage processor (see e.g., the storage processor 102 of FIG. 1). The cache manager 108 is coupled to the command processor 106 and to the cache management memory (see e.g., cache management memory region 116 in FIG. 1) through the cache management memory interface 214. The command processor 106 receives commands from the storage processor and retrieves, via DMA, HWCCB images or search structures from processor memory through the storage processor. In accordance with the type of cache command, the command processor 106 initiates the appropriate state machine logic in the cache manager 108.

For example, if the storage processor provides a SEARCH command, the command processor 106 retrieves the appropriate search structure from the processor memory and passes the data therein to a search logic module 202, which executes a search operation (see the flowchart in FIG. 6). The search logic module 202 uses the search key from the provided search structure to access the hash logic module 210. Hashing is a common method of accessing data structures. A hash key is a number generated from a string value, and is substantially smaller than the data structure itself, and is generated by a formula in such a way that it is unlikely that some other text will produce the same hash value. To generate a hash index into a hash table, a hashing operation is applied to each name to produce a unique numeric value. In the preferred embodiment, the data in the search key field is used as the string value in the hashing operation, and the hash table includes pointers to the starting elements of HWCCB linked lists in the cache management memory region.

The hash logic module 210 returns an address to a linked list in the cache management memory region. The search logic module 202 then traverses the linked list until it finds the HWCCB having a search key that matches the search key from the provided search structure. The data from the HWCCB in the cache management memory region is DMAd to the processor memory for access by the storage processor. If a matching HWCCB is not located in the cache management memory, the HWCCB image is returned to the processor memory with a NULL value in the CB address field. A FAILURE_COMPLETE is also returned to the HWCCB image in the processor memory.

To execute a DELETE command (see the flowchart in FIG. 7), an embodiment of the present invention includes a delete logic module 206 that receives a list of one or more HWCCB images from the command processor. The delete logic module 206 traverses each HWCCB image and uses the search key provided therein to access the hash logic module 210. The hash logic module 210 returns to the delete logic module 206 an address to a linked list in the cache management memory region. The delete logic module 206 traverses or otherwise locates the HWCCB includes a search key that matches the search key provided by the command processor. If such an HWCCB is found, the delete logic module 206 deletes the HWCCB from the linked list and the command processor returns a SUCCESS_COMPLETE status. Otherwise, a FAILURE_COMPLETE status is returned. In an alternative embodiment, a SUCCESS_COMPLETE status is returned instead of a FAILURE_COMPLETE status to indicate that, although the specified search key was not located, the result is essentially the same as if it were located (i.e., the corresponding HWCCB is not in a cache management memory region). Upon a successful completion, the cache management memory corresponding to the deleted HWCCB is deallocated, or preferably, placed in a cache management resource manager data structure for later reuse (see linked list 312 in FIG. 3). In an embodiment of the present invention, the cache management resource data structure is a linked list managed by a cache management resource manager module 212.

To execute an INSERT command (see the flowchart in FIG. 5), an embodiment of the present invention includes insert logic module 208 that receives a list of one or more HWCCB images from the command processor. The insert logic module 208 traverses each HWCCB image and uses the search key provided therein to access the hash logic module 210. The hash logic module 210 returns to the insert logic module 208 an address to a linked list in the cache management memory region. The insert logic module 208 traverses or otherwise locates an appropriate location in the list (in accordance with the search key) to insert the HWCCB in the linked list. If an HWCCB is found in the list that already matches the search key, the command processor is notified of the collision, and the command processor returns a status indicating the collision. A FAILURE_COMPLETE is also returned to the HWCCB image in the processor memory. Otherwise, an HWCCB is allocated or pulled from a cache management resource manager data structure for later use (see linked list 312 in FIG. 3). The data from the HWCCB list is loaded into the new HWCCB and inserted into the linked list.

In an embodiment of the present invention, a balancing logic module 204 represents a state machine that is used if the data structures in the cache management memory could benefit from a balancing operation. For example, if the pointers in the hash table point to the starting points of binary trees, instead of simple linked lists, the balancing logic 204 can balance each binary tree (i.e., more symmetrically distribute HWCCBs in each binary tree structure) in response to an INSERT or DELETE operation.

FIG. 3 illustrates logical elements stored in a cache management memory region 116 in an embodiment of the present invention. It is to be understood that the figure does not represent a physical organization of the cache management memory region 116. Instead, FIG. 3 represents a logical organization of the data structures in the cache management memory region 116. The hash table region 300 represents the logical configuration of a hash table data structure, and the hashing logic module 210 manages this structure. The hash table index 306 represents indexes or address locations of the hash table elements, which include linked list pointers 308 indicating the starting elements in the linked list region 302. Alternatively, another linked data structure, such as a binary tree or doubly linked list, may be incorporated into the region 302. Each of the data blocks 310 represents a populated HWCCB indicating the location of a CB in the cache memory region corresponding to a storage location in the disk array or other storage medium. It should also be understood that some elements of the hash table may be empty (i.e., not pointing to a populated HWCCB linked list—see, for example, hash index "n-3"). For example, in an embodiment of the present invention, when the system is powered up after a controlled shut down, the cache memory region is empty, and there are no HWCCBs in the linked list region 302. As CBs are inserted into the cache memory region, HWCCBs are inserted into the cache management memory region.

The Cache Management Resource Linked List 304 is an optional linked data structure managed by the cache management resource manager 212 (of FIG. 2). When an INSERT command is received by the command processor, the insert logic module requests an HWCCB from the cache management resource manager, which removes an HWCCB from the linked list 312 and transfers it to the insert logic module. This transaction essentially involves removing from the resource manager linked list a pointer to an HWCCB and passing the pointer to the insert logic module, rather than physical data movement of the HWCCB itself. Likewise, when the delete logic module deletes an HWCCB from the linked lists 302, it passes a pointer to the deleted HWCCB to the cache management resource manager, which inserts the HWCCB into the cache management resource linked list 304.

Figure 4:
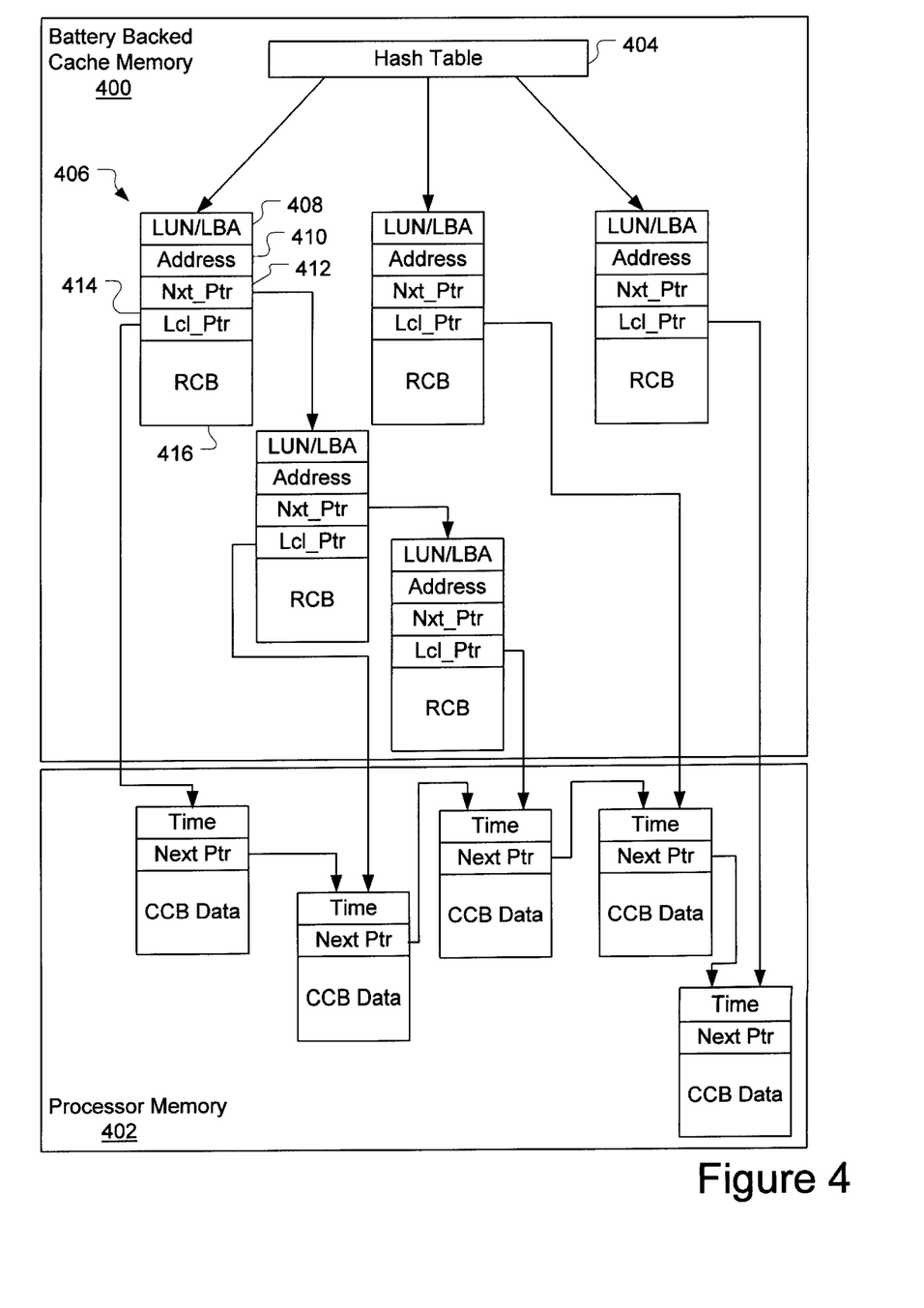
FIG. 4 illustrates exemplary cache management structures in an embodiment of the present invention.

FIG. 4 illustrates exemplary cache management structures in an embodiment of the present invention. In an embodiment of the present invention, battery backed cache memory 400 represents the cache management memory region 116 of FIG. 1 and includes a hash table 404 and link data structures comprising HWCCBs. For example, HWCCB 406 is indicated by a pointer from the hash table 404 and includes the search key 408, a cache block address field 410, a next pointer (NXT_PTR) 412 indicating the next HWCCB in the link data structure, a local pointer (LCL_PTR) indicating the location of a CCB in the processor memory 402, and an RCB 416. As shown, hash table 404 includes pointers to three HWCCB link lists, with one link list having three HWCCBs and two link lists having one HWCCB each.

Figure 5:
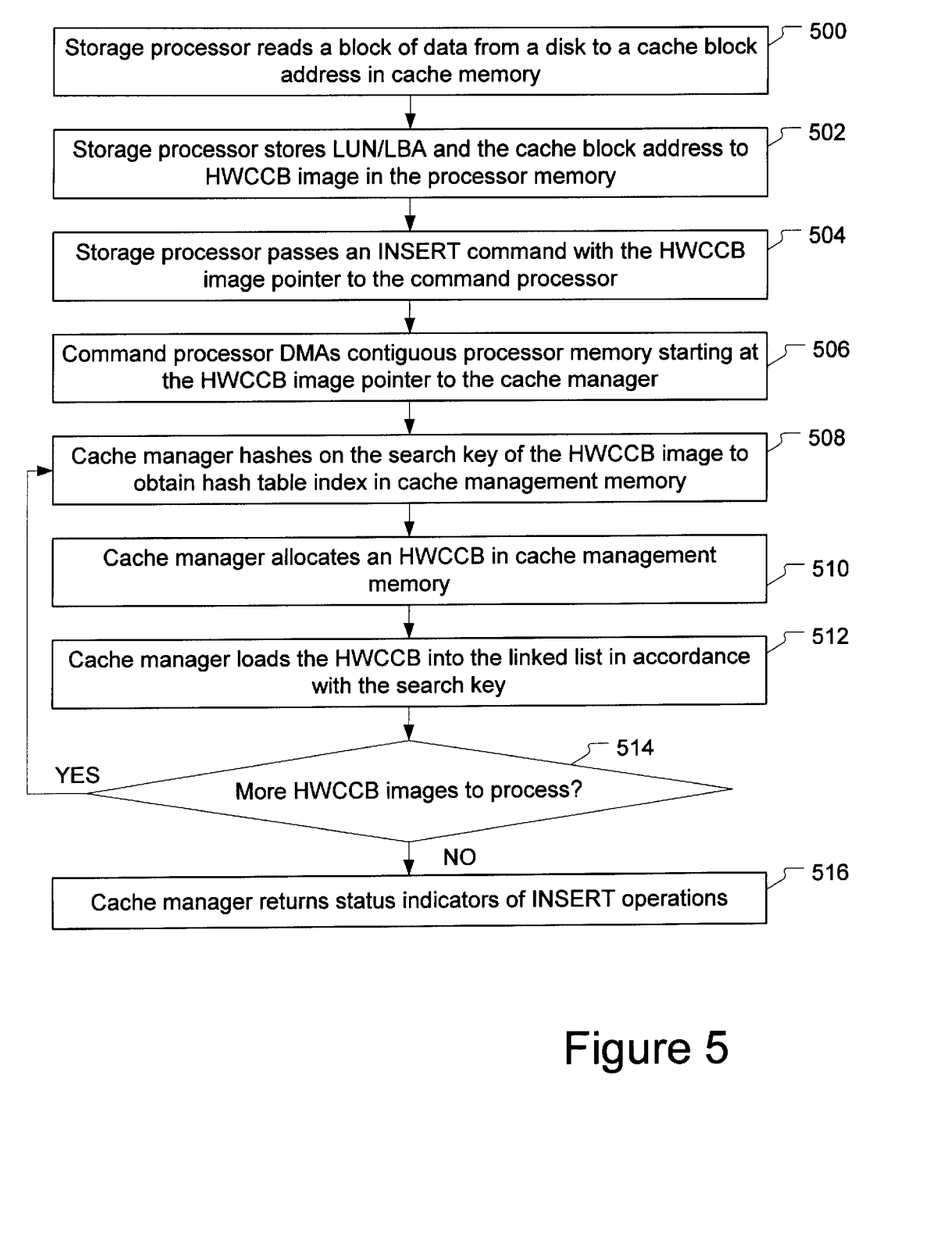
FIG. 5 depicts a flowchart of operations relating to an INSERT command in an embodiment of the present invention.

FIG. 5 depicts a flowchart of operations relating to an INSERT command in an embodiment of the present invention. In operation 500, the storage processor reads a block of data from a disk in the disk array and stores it to a cache block address in the cache memory region. In operation 502, the storage processor stores the storage location identifier (e.g., LUN/LBA) and the cache block address to an HWCCB image in the processor memory. In operation 504, the storage processor passes an INSERT command with a pointer to the HWCCB image to the command processor. It should be understood that the pointer can correspond to a region or list of multiple HWCCB images in the processor memory. In operation 506, the command processor DMAs contiguous memory starting at the image pointer and transfers an HWCCB image to the cache manager. Alternatively, if the HWCCB images are stored in a linked list in the processor memory, the command processor DMAs the linked HWCCB images from the processor memory.

In operation 508, the cache manager hashes on the search key of the HWCCB image to obtain a hash table index in cache management memory. In operation 510, the cache manager allocates an HWCCB in cache management memory. Alternatively, an empty HWCCB is provided by a cache management resource manager at the request of the cache manager. In operation 512, the cache manager loads the HWCCB with the parameters from the HWCCB image and inserts the HWCCB into the link list identified by the hash table logic in accordance with the search key. For example, if the link list is ordered according to a "last in, first out" order, the cache manager loads the pointer to the beginning of the link list into the next pointer in the HWCCB and loads the pointer to the HWCCB in the hash table element corresponding to the search key. Alternatively, if the link list is ordered according to search order, the cache manager traverses the link list and inserts the HWCCB in the appropriate link of the list.

Operation 514 determines whether additional HWCCB images retrieved by the command processor remain to be processed. If so, processing returns to operation 508, looping until all retrieved HWCCB images are inserted into HWCCBs in the appropriate link lists. Otherwise, the cache manager returns status indicators of the INSERT operations.

FIG. 6 depicts a flowchart of operations relating to a SEARCH command in an embodiment of the present invention. In operation 600, the storage processor stores the search key (e.g., LUN/LBA) to a search structure in the processor memory. Preferably, the search structure is used by the storage processor to search the cache management memory for HWCCBs associated with a list of search keys. A search structure comprises a 64 bit search key field including the storage location identifiers used in the search key field of the HWCCB itself. The search structure also comprises a 64 bit HWCCB pointer field, which contains the result of the searching operation. For example, if the search logic finds an HWCCB corresponding to the provided search key, the HWCCB pointer field would contain the address of the located HWCCB in the cache management memory region. If the corresponding HWCCB is not located by the search logic, the field is returned with a NULL value. The search structure also comprises a 64 bit next pointer field, indicating the next search structure in the list, if any. When a search structure returns with a populated HWCCB pointer field, the storage controller receives the HWCCB pointer and can retrieve the HWCCB via DMA.

In operation 602, the storage processor passes a search command with a pointer to the search structure to the command processor. In operation 604, the command processor DMAs the processor memory starting at the search structure pointer into the cache manager. In operation 606, the cache manager hashes on the search key of a search structure to obtain a hash table index into cache management memory. The hash table index corresponds with the start of a link list containing HWCCBs.

In operation 608, the cache manager searches the link list for the HWCCB that matches the search key from the search structure. Operation 610 determines whether the HWCCB corresponding to the provided search key is found. If so, the cache manager loads a found status and the corresponding cache block address from the located HWCCB into the HWCCB image in operation 616. Otherwise, the cache manager loads a not found status into the HWCCB image in operation 612. In an embodiment of the present invention, a null value is written into the cache block address of the HWCCB image.

Operation 618 determines whether additional HWCCB images are to be processed. If so, processing proceeds to operation 606 and the search loop repeats. Otherwise, the cache manager returns the cache block addresses and the status values via the command processor to the processor memory in operation 620. In operation 622, the storage processor DMAs the data found in the located HWCCBs from the cache management memory region and accesses the cache block for the located HWCCBs at the returned cache block addresses. In this manner, the storage processor off-loads much of the processing of the cache management structures to the cache manager. In effect, a storage processor requests that one or more cache blocks be located in accordance with a storage location identifier, and the cache manager returns to the corresponding cache memory address.

Figure 7:
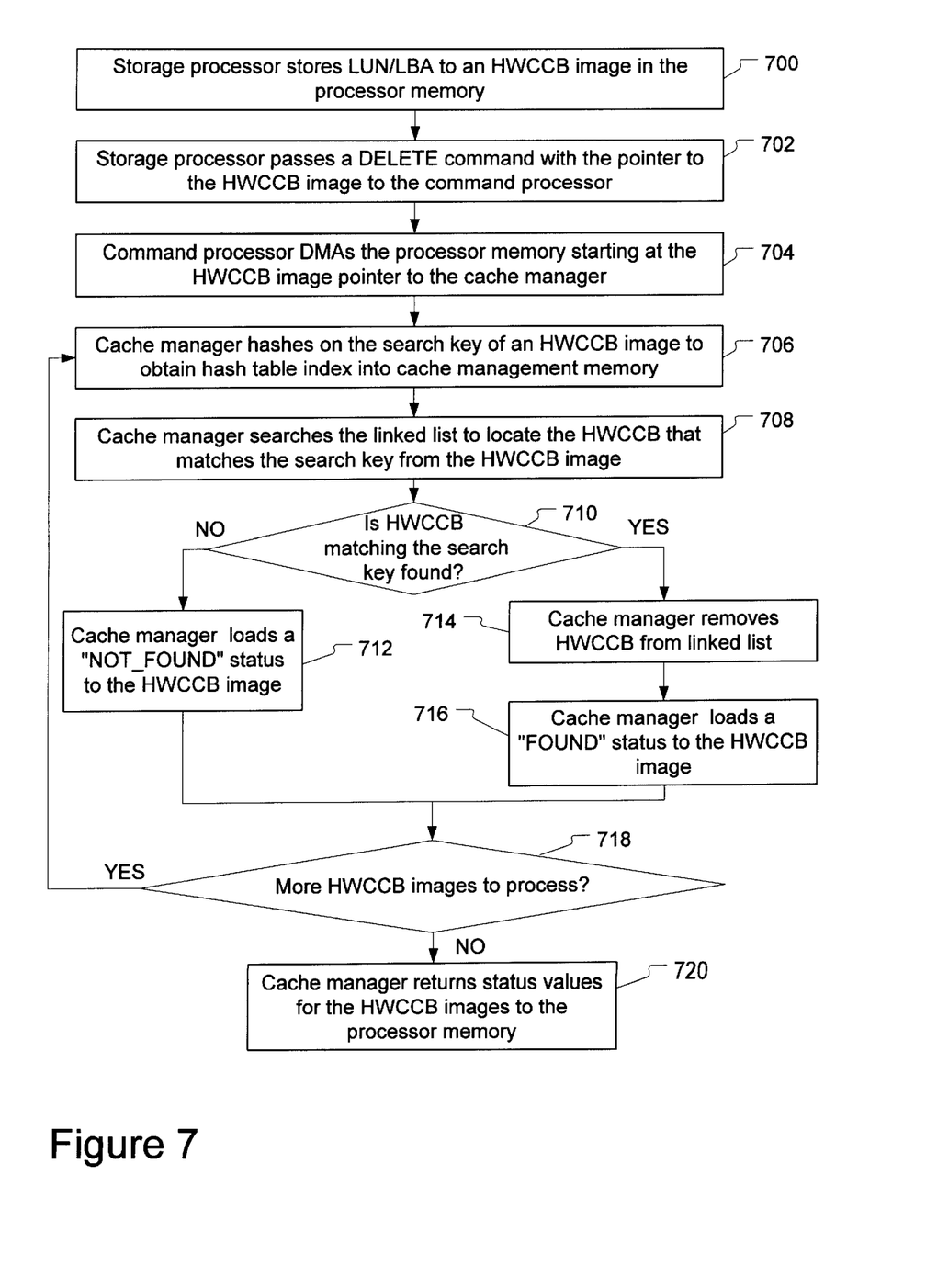
FIG. 7 depicts a flowchart of operations relating to a DELETE command in an embodiment of the present invention.

FIG. 7 depicts a flowchart of operations relating to a DELETE command in an embodiment of the present invention. In operation 700, the storage processor stores a search key (e.g., LUN/LBA) to an HWCCB image in the processor memory. In operation 702, the storage processor passes a DELETE command with a pointer to the HWCCB image to the command processor. In operation 704, the command processor DMAs the processor memory starting at the HWCCB image pointer to the cache manager. It should be understood that the HWCCB images in the processor memory are located in contiguous memory, or alternatively, in a linked list or other linked structure to allow multiple HWCCB images to be DMAd by the command processor.

In operation 706, the cache manager hashes on the search key of an HWCCB image to obtain a hash table index into cache management memory. In operation 708, the cache manager searches the link list corresponding to the hash table index to locate the HWCCB that matches the search key from the HWCCB image. Operation 710 determines whether a matching HWCCB is found. If so, in operation 714 the cache manager removes the HWCCB from the link list and in operation 716 the cache manager loads a found status into the HWCCB image. If operation 710 does not determine that a matching HWCCB is FOUND, the cache manager in operation 712 loads a NOT_FOUND status to the HWCCB image. Operation 718 determines whether additional HWCCB images remain to be processed. When all HWCCB images have been processed, operation 720 returns the status values for the HWCCB images to the processor memory.

The above specification, examples and data provide a complete description of the manufacture and use of the composition of the invention. One such embodiment includes combining the processor memory 104 and the cache memory 112 of FIG. 1 into the same set of memory devices having distinct regions for processor memory, cache management memory, and cache memory. Since many embodiments of the invention can be made without departing from the spirit and scope of the invention, the invention resides in the claims hereinafter appended.

We claim:

1. A system for managing data stored in a cache block in a cache memory, the cache block being located at a cache block address in the cache memory, wherein the data in the cache block corresponds to a storage location in a storage array identified by a storage location identifier, the system comprising:

a storage processor that accesses the cache block in the cache memory and provides a cache management command;

a processor memory coupled to the storage processor that stores a search key based on the storage location identifier corresponding to the cache block;

a command processor coupled to the storage processor, said command processor receives a cache management command specified by the storage processor and transfers the storage location identifier from the processor memory;

a cache management memory that stores a cache management structure including the cache block address and the search key; and a cache management processor coupled to the cache management memory to manipulate the cache management structure in a linked data structure within the cache management memory in accordance with the cache management command and the search key.

2. The system of claim 1 wherein the storage element identifier includes a logical unit number associated with a storage disk.

3. The system of claim 1 wherein the storage element identifier includes a logical block addressing address associated with the storage location of a storage disk.

4. The system of claim 1 wherein the cache management processor comprises:

an insert module that inserts the cache management structure in the linked data structure in accordance with the search key, wherein the cache management structure stores the cache block address.

5. The system of claim 1 wherein the cache management processor comprises:

a search module that searches for the cache management structure in the linked data structure in accordance with the search key and provides the cache block address stored in the cache management structure to the storage processor, if the cache management structure is found.

6. The system of claim 1 wherein the cache management processor comprises:

a delete module that deletes from the linked data structure the cache management structure corresponding to the search key.

7. The system of claim 1 wherein the cache management processor comprises:

a hashing module that hashes on the search key to generate an identifier corresponding to the linked data structure stored in the cache management memory.

8. The system of claim 1 wherein the linked data structure comprises a binary tree and the cache management processor comprises a balancing module that balances the binary tree responsive to the cache management command.

9. The system of claim 1 wherein the cache management structure comprises a recovery control block including a status value indicating whether the cache block associated with the cache management structure is valid.

10. The system of claim 1 wherein the cache management structure comprises a recovery control block including a status value indicating whether the cache block associated with the cache management structure is dirty.

11. The system of claim 1 wherein the cache management structure comprises a recovery control block including a status value indicating whether the cache block associated with the cache management structure is mirrored.

12. The system of claim 1 wherein the cache management memory comprises battery backed memory.

13. A method for managing data stored in a cache block in a cache memory, the cache block being located at a cache block address in the cache memory, wherein the data in the cache block corresponds to a storage location in a storage array identified by a storage location identifier, the method comprising:

receiving a cache management command from a storage processor;

receiving from the storage processor a processor memory address associated with a search key based on the storage location identifier;

transferring the search key from the processor memory in accordance with the processor memory address;

manipulating a cache management structure in a linked data structure in the cache management memory in accordance with the cache management command and the search key.

14. The method of claim 13 further comprising:

transferring cache management data associated with the search key from processor memory to the cache management structure in the cache management memory.

15. The method of claim 13 wherein the manipulating operation comprises inserting the cache management structure into the linked data structure in accordance with the search key, wherein the cache management structure stores the cache block address.

16. The method of claim 13 wherein the manipulating operation comprises deleting the cache management structure from the linked data structure in accordance with the search key.

17. The method of claim 13 wherein the manipulating operation comprises searching for the cache management structure in the linked data structure in accordance with the search key and returning the cache block address stored in the cache management structure to the storage processor.

18. The system of claim 13 further comprising:

hashing on the search key to generate an identifier corresponding to the linked data structure stored in the cache management memory.

19. The method of claim 13 wherein the linked data structure comprises a binary tree and further comprising balancing the binary tree responsive to the cache management command.

* * * * *